United States Patent [19]

Terano et al.

[11] Patent Number: 4,640,906

[45] Date of Patent: Feb. 3, 1987

[54] CATALYST FOR THE POLYMERIZATION OF OLEFINS

[75] Inventors: Minoru Terano; Yasushi Yokoyama; Masuo Inoue; Katsuyoshi Miyoshi, all of Kanagawa, Japan

[73] Assignee: Toho Titanium Co., Ltd., Tokyo, Japan

[21] Appl. No.: 793,750

[22] Filed: Nov. 1, 1985

[30] Foreign Application Priority Data

Nov. 1, 1984 [JP] Japan ................. 59-229024

[51] Int. Cl.$^4$ ............................................... C08F 4/64
[52] U.S. Cl. ................................. 502/104; 502/112; 502/123; 502/127; 526/124
[58] Field of Search ............... 502/104, 123, 127, 112

[56] References Cited

U.S. PATENT DOCUMENTS

| | | | |
|---|---|---|---|
| 4,324,690 | 4/1982 | Karayannis et al. | 502/123 X |
| 4,400,302 | 8/1983 | Goodall et al. | 502/127 X |
| 4,460,701 | 7/1984 | Terano et al. | 502/127 X |
| 4,535,068 | 8/1985 | Job | 502/123 X |
| 4,547,476 | 10/1985 | Terano et al. | 502/127 |

*Primary Examiner*—Patrick P. Garvin
*Attorney, Agent, or Firm*—Birch, Stewart, Kolasch and Birch

[57] ABSTRACT

A catalyst for the polymerization of olefins which comprises:
(1) a solid catalyst component,
(2) a piperidine derivative and
(3) an organoaluminum compound, characterized in that the solid catalyst component (A) has been prepared by mixing (a) a dialkoxymagnesium and (b) a diester of an aromatic dicarboxylic acid with (c) a halogenated hydrocarbon to form a suspension and thereafter adding the suspension to (d) a titanium tetrahalide to effect reaction, as well as the solid catalyst component and a process for preparing same. The catalyst maintains a high polymerization activity combined with stereospecific performance over a prolonged polymerization time and scarcely incurs any problem of corrosion and odor in the resultant polymer.

34 Claims, No Drawings

CATALYST FOR THE POLYMERIZATION OF OLEFINS

BACKGROUND OF THE INVENTION

1. Field of the Invention

The present invention relates to a catalyst for the polymerization of olefins, a solid catalyst component utilizable for the catalyst and a process for the preparation of such catalyst component. More particularly, the present invention relates to a solid catalyst component derived from a dialkoxymagnesium, a diester of an aromatic dicarboxylic acid, a halogenated hydrocarbon and a titanium tetrahalide, a catalyst obtained from the solid catalyst component, a piperidine derivative and an organoaluminum compound and useful for the production of stereoregular olefin polymers in a higher yield, and a process for the preparation of the solid catalyst component by contacting the above ingredients in a specific order of succession.

2. Description of the Prior Art:

From the past, a number of Ziegler type catalysts derived from a combination of a titanium halide and an organoaluminum compound are widely known and used for the polymerization of olefins. In the polymerization of olefins by the aid of such catalyst, however, the yield of polymers per solid catalyst component or titanium contained therein (referred to hereinafter as the polymerization activity per solid catalyst component or titanium contained therein, respectively) is low so that the step for eliminating the catalyst residue, i.e. the deashing step is necessary after the polymerization step. Since such deashing step requires a large amount of an alcohol or a chelating agent, facilities for recovering or regenerating the solvent or chelating agent are necessary in the commercial process, thus creating a problem of resource, energy and incidental factors. Thus, there were many key problems to be solved immediately in the prior art processes for polymerization of olefins. Since then, extensive research has been carried out to omit such tremendous deashing treatment thereby enhancing the polymerization activity per solid catalyst component, especially per titanium contained therein.

According to the recent tendency, a number of proposals have been presented wherein a transition metal compound as active ingredient, such as a titanium halide, is supported on a carrier such as magnesium halide with an attempt to increase the polymerization activity per titanium in the catalyst component significantly in case of being used for the polymerization of olefins. However, the processes recently proposed have also such drawbacks that chlorine contained in the magnesium chloride chiefly used as the carrier as well as a halogen atom contained in the titanium halide have a negative influence on the resultant polymer. In these processes, therefore, a problem still remains unsolved in that the activity demanded is decreased to a level at which the influence of chlorine is almost negligible, or alternatively, the concentration itself of chlorine has to be reduced.

With a view to minimizing the residual chlorine in the polymer produced, a process aiming at decreasing the amount of the residual chlorine in the polymer while maintaining a high polymerization activity per solid catalyst component and a high yield of stereoregular polymer was developed and disclosed in Japanese Laid-open Patent Appln. No. Sho. 59-91107.

Generally, on the polymerization of olefins in an industrial scale, especially in the commercial production of stereoregular polymers from propylene, butylene-1 or the like olefins, with the aid of a polymerization catalyst containing magnesium chloride as a support, it is usually indispensable to allow an electron donor such as an ester of an aromatic carboxylic acid to be co-existent with the catalyst in the polymerization system. However, the presence of such ester in the polymerization system raises a new problem as the ester imparts its peculiar esteric odor to the resultant polymer.

What is more, a serious problem arises in the use of such catalyst. In the so-called supported catalysts, such as a catalyst containing magnesium chloride as a support, the activity at the initial stage of polymerization is certainly high but is considerably deactivated with the lapse of time, thus incurring a problem in process operations. Consequently, the use of the catalyst of this type is substantially impossible for the purpose of block copolymerization where a relatively longer polymerization time is required. To improve this drawback, a modified process is disclosed, for example, in Japanese Laid-open Patent Appln. No. Sho. 54-94590 wherein a magnesium dihalide is treated with an electron donor and a tetravalent titanium compound optionally with an electron donor, and then the resultant product is combined with an organoaluminum compound, an ester of an aromatic carboxylic acid and a compound of the formula: M-O-R (wherein M is a metal belonging to the Groups I-A, II-A, II-B, III-A, III-B, IV-A and IV-B of the Periodic Table and R is hydrogen or a hydrocarbyl group) to form a catalyst for the polymerization of olefins. In this process, the catalyst is not satisfactorily prevented from deactivation, and moreover, the problem of "odor" in the resultant polymer is not as yet solved since the ester is used together with the catalyst on polymerization of olefins. Further, the preparation of the catalyst and the polymerization method according to this process requires a troublesome and complicates operations as described in Example I(A), (B) and (C) given in the specification of this reference. Thus, the catalyst proposed in this reference is slightly improved in the catalyst performance but does not reach a practically satisfactory level in both catalytic performance and maintenance of activity.

In Japanese Laid-open Patent Appln. No. Sho. 58-138706, there is disclosed a process for the polymerization of olefins with the aid of a specific catalyst which is derived from a highly active catalyst component containing magnesium, titanium, halogen and an electron donor, an organoaluminum compound, and a heterocyclic compound or a branched alkyl-containing ketone. In this catalyst, the electron donor is an ester of a polybasic carboxylic acid such as a dialkyl phthalate or an ester of a specific branched chain- or ring-containing monocarboxylic acid such as trimethylacetic acid, while the heterocyclic compound is an α,α'-di-tri- or -tetrasubstituted heterocyclic compound such as 2,6-disubstituted or 2,2,6,6-tetrasubstituted pyran or piperidine. According to this process, the yield of stereoregular polymer is enhanced to a certain degree and the aftertreatment usually necessary for eliminating residual catalyst can be omitted. However, the magnesium compound actually used in the catalyst component in all Examples is only magnesium chloride although the compound is broadly defined so that it may be an alkoxymagnesium halide or even an alkoxymagnesium. Furthermore, the reaction condition for preparing the catalyst is extremely troublesome and complicated, especially in controlling the temperature, as is evident from Examples 1-4 of this reference.

In U.S. Pat. No. 4,414,132, there is disclosed a polymerization catalyst for olefins and a process for preparing the same wherein the catalyst is obtained by combining an organoaluminum compound and a selectivity control agent with a solid component which has specifically been prepared by halogenating a magnesium compound such as diethoxymagnesium with a titanium tetrahalide in the presence of a halohydrocarbon and an electron donor which may be identical with the selectivity control agent, and then contacting the halogenated product with a titanium tetrahalide. Namely, the gist of this patent resides in the use of a specific solid component prepared in a specific manner from the magnesium compound, the titanium halide and the electron donor. According to Example 2 of this patent illustrating the preparation of the solid component, a dialkoxymagnesium is suspended in carbon tetrachloride, ethyl benzoate as a preferable electron donor and titanium tetrachloride are added to the suspension at 75° C. and the mixture is stirred for 2 hours while maintaining the temperature at 75° C. The resultant solid is once isolated, washed 5 times with iso-octane to form a solid (Component a). This solid is further suspended in titanium tetrachloride at 80° C. and the suspension is subjected to stirring for 2 hours whereupon a solid formed is separated and washed 5 times with iso-octane to form a solid component (Component b). The resultant component is combined with triethylaluminum and p-methoxybenzoic acid ethyl ester (the most preferable selectivity control agent) to form a catalyst for the polymerization of olefins, as illustrated in Example 1. In this process, however, a preferable electron donor which also functions as the selectivity control agent is an ester of an aromatic monocarboxylic acid. According to the process of this patent, the polymerization activity of the catalyst and the yield of stereoregular polymer are certainly improved but do not still reach a satisfactory level desired in the industrial scale production of olefin polymers. In particular, maintenance of the activity against deactivation is scarcely improved in the catalyst of this patent.

Under the above circumstances, therefore, there is a great demand for developing a new catalyst for the polymerization of olefins which is remarkably improved in any of the polymerization activity, stereospecific performance and maintenance of the activity to a satisfactory level in the actual commercial scale production of stereoregular olefin polymers in a high yield.

BRIEF SUMMARY OF THE INVENTION

Accordingly, it is an object of the present invention to provide a new catalyst for the polymerization of olefins which enables the production of stereoregular polymers in a high yield over a prolonged period of time without being deactivated.

It is another object of the present invention to provide a new catalyst for the polymerization of olefins which overcomes drawbacks of the prior art catalysts incurring problems of corrosion and odor in the resultant polymer.

It is still another object of the present invention to provide a solid catalyst component for the catalyst, which is obtained according to a specific but simple method.

It is further object of the present invention to provide a process for the preparation of the solid catalyst component wherein the individual ingredients are brought into contact in a specific order of succession under agitation.

It is still further object of the present invention to use the catalyst for the production of olefin polymers, especially those of stereoregular structure.

Other and further objects, features and advantages of the present invention will be apparent more fully from the following description.

The present inventors have made extensive research for developing a new catalyst for the polymerization of olefins, which overcomes the various drawbacks seen in the prior art catalysts and enables the production of stereoregular polymers in a higher yield over a prolonged polymerization time without being deactivated. As a result of such extensive research, it has now been found surprisingly that a catalyst obtained by combining an organoaluminum compound and a piperidine derivative with a solid catalyst component having been prepared by mixing a dialkoxymagnesium and a diester of an aromatic dicarboxylic acid with a halogenated hydrocarbon to form a suspension and adding the suspension to a titanium tetrahalide, has a high polymerization activity combined with stereospecific performance over a prolonged polymerization time without being deactivated and scarcely incurs problems of corrosion resulting from residual halogen and odor resulting from the use of an ester in the resultant polymer. The present invention has been accomplished on the basis of the above finding.

DETAILED DESCRIPTION OF THE INVENTION

In accordance with one embodiment of the present invention, there is provided a catalyst for the polymerization of olefins which comprises:

(A) a solid catalyst component,
(B) a piperidine derivative and
(C) an organoaluminum compound, characterized in that the solid catalyst component (A) has been prepared by mixing (a) a dialkoxymagnesium and (b) a diester of an aromatic dicarboxylic acid with (c) a halogenated hydrocarbon to form a suspension and thereafter adding the suspension to (d) a titanium tetrahalide to effect reaction.

In accordance with another embodiment of the present invention, there is provided a solid catalyst component for the catalyst utilizable for the polymerization of olefins which has been prepared by mixing (a) a dialkoxymagnesium and (b) a diester of an aromatic dicarboxylic acid with (c) a halogenated hydrocarbon to form a suspension and thereafter adding the suspension to (d) a titanium tetrahalide thereby effecting reaction to obtain a solid matter.

In accordance with still another embodiment of the present invention, there is provided a process for the preparation of a solid catalyst component utilizable for the polymerization of olefins which comprises mixing (a) a dialkoxymagnesium and (b) a diester of an aromatic dicarboxylic acid with (c) a halogenated hydrocarbon to form a suspension and thereafter adding the suspension to (d) a titanium tetrahalide thereby effecting reaction to obtain a solid matter.

Merely by the term "polymerization" is meant herein any type of the polymerizations including homopolymerization and copolymerization of olefins as well as any mode of the polymerization including gas or bulk polymerization in the absence of any polymerization solvent and slurry polymerization in the presence of a polymerization solvent.

The dialkoxymagnesium used in the present invention is generally represented by the following general formula:

  (I)

wherein A and A' may be the same or different and each represents a $C_1$-$C_8$ alkoxy group. Preferably, A and A' are identical with each other and are $C_2$-$C_4$ alkoxy groups which may be branched in the alkyl moiety. Illustrative of the preferable dialkoxymagnesium are, for example, diethoxymagnesium, dipropoxymagnesium, diisopropoxymagnesium, dibutoxymagnesium, di-sec-butoxymagnesium and di-tert-butoxymagnesium. Among these, dialkoxymagnesiums such as diethoxymagnesium and dipropoxymagnesium are particularly preferable.

The diester used in the present invention is a phthalic diester generally represented by the following general formula:

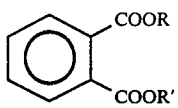  (II)

wherein R and R' may be the same or different and each represents a $C_1$-$C_8$ alkyl group which may be branched at any desired position. Preferably, R and R' are $C_2$-$C_5$ alkyl groups which may be branched at any desired position. Illustrative of the preferable diester are, for example, dimethyl phthalate, diethyl phthalate, dipropyl phthalate, diisopropyl phthalate, dibutyl phthalate, diisobutyl phthalate, diamyl phthalate, diisoamyl phthalate, methyl ethyl phthalate, methyl propyl phthalate, methyl butyl phthalate, methyl isobutyl phthalate, ethyl propyl phthalate, ethyl butyl phthalate, ethyl isobutyl phthalate, propyl butyl phthalate, propyl isobutyl phthalate, propyl amyl phthalate and butyl amyl phthalate. Among these diesters, lower ($C_1$-$C_4$) dialkyl diesters wherein R and R' are identical with each other are most preferable, such as diethyl phthalate, dipropyl phthalate, dibutyl phthalate, diisobutyl phthalate and diamyl phthalate.

The halogenated hydrocarbon used in the present invention is a halide of aromatic and aliphatic hydrocarbons which is normally liquid. Illustrative of the halogenated hydrocarbon are, for example, propyl chloride, butyl chloride, propyl bromide, butyl bromide, ethyl iodide, propyl iodide, butyl iodide, chlorobenzene, bromobenzene, benzyl chloride, benzyl bromide, methylene dichloride, dichloroethane, dichloropropane dichlorobutane, dibromoethane, dibromopropane, dichlorobenzene, dibromobenzene, chloroform, trichloroethane and carbon tetrachloride. Chlorinated hydrocarbons are preferable and propyl chloride, methylene dichloride, dichloroethane, dichlorobenzene, chloroform and carbon tetrachloride are particularly preferable.

The titanium tetrahalide used in the present invention includes $TiCl_4$, $TiBr_4$ and $TiI_4$, with $TiCl_4$ being preferred.

The piperidine derivative used in the present invention is a disubstituted or tetrasubstituted piperidine generally represented by the following general formula:

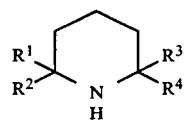  (III)

wherein $R^1$, $R^2$, $R^3$ and $R^4$ each stands for a hydrogen atom or an alkyl group with the proviso that at least one of $R^1$ and $R^2$ and/or at least one of $R^3$ and $R^4$ is an alkyl group. Preferably, the alkyl group is a $C_1$-$C_8$, more preferably $C_1$-$C_4$ alkyl group such as methyl, ethyl, propyl, isopropyl or butyl. The piperidine derivative is preferably disubstituted or tetrasubstituted with the same alkyl groups, and preferable examples include 2,6-diethylpiperidine, 2,6-diisopropylpiperidine, 2,6dibutylpiperidine, 2,2,6,6-tetramethylpiperidine, 2,2,6,6tetraethylpiperidine and 2,2,6,6-tetrapropylpiperidine. Among these, 2,2,6,6-tetramethylpiperidine is particularly preferable.

The organoaluminum compound used in the present invention is represented by the following formula:

  (IV)

wherein R is a $C_1$-$C_8$ alkyl group, Q and Q' may be the same or different and each represents R or X, and X is a halogen atom. Thus, the organoaluminum compound includes a trialkylaluminum, a dialkylaluminum halide and an alkylaluminum dihalide as well as a mixture of these aluminum compounds. Preferable examples of the organoaluminum compound include triethylaluminum, tripropylaluminum, triisopropylaluminum, tributylaluminum, triisobutylaluminum, diethylaluminum chloride, diethylaluminum bromide, diisopropylaluminum chloride, dibutylaluminum chloride, ethylaluminum dichloride, propylaluminum dichloride and butylaluminum chloride. Particularly preferable are trialkylaluminums with triethylaluminum and triisobutylaluminum being most preferable.

In the preparation of the solid catalyst component, each essential ingredient can be employed in any desired amount unless the solid catalyst component derived from the ingredients be influenced adversely. Thus, no specific limitation exists in the proportion of the dialkoxymagnesium, the diester of the aromatic dicarboxylic acid, the halogenated hydrocarbon and the titanium tetrahalide. In general, however, the diester is used preferably in an amount ranging from 0.1 g to 1 g per gram of the dialkoxymagnesium. The titanium tetrahalide is preferably used in an amount of at least 1 g, preferably 5 g per gram of the dialkoxymagnesium. If the above proportions are greater or smaller than the above ranges, the polymerization activity and the yield of stereoregular polymers will be reduced but the polymerization itself will proceed without any trouble. The halogenated hydrocarbon can be used in any desired amount but is preferably used in an amount capable of forming a flowable suspension.

The solid catalyst component of the present invention is prepared according to a specific process from these essential ingredients. At the outset, the halogenated hydrocarbon as a suspension medium and the other remaining essential ingredients are mixed in any order of succession to form a suspension. For example, the dialkoxymagnesium is suspended in the presence of the diester of the aromatic dicarboxylic acid in the halogenated hydrocarbon. This mixing treatment is carried out usually at a temperature between 0° C. and the boiling point of the halogenated hydrocarbon used, and the resultant suspension is preferably kept at that temperature for a period of 100 hours or less, preferably 10 hours or less. Next, the suspension has to be contacted with the titanium tetrahalide usually at a temperature ranging from 90° C. to 130° C. for a period from 30 minutes to 100 hours.

Thus, the titanium tetrahalide among the essential ingredients is used at the final stage of the process for preparing the solid catalyst component. If the titanium tetrahalide is used at the initial stage of the process, the solid catalyst component obtained will fail to afford a catalyst with a high polymerization activity. Consequently, the preparation of the solid catalyst component has to be carried out in a specific order of succession with respect to the use of the essential ingredients; a dialkoxymagnesium, a diester of an aromatic dicarboxylic acid and a halogenated hydrocarbon are mixed individually or at a time to form a suspension and then the suspension is added to the titanium tetrahalide. If the temperature for contacting the suspension with the titanium tetrahalide is lower than 90° C., the bulk density of the polymer will significantly be reduced and the yield of a stereoregular polymer will also be decreased slightly. On the other hand, if the temperature exceeds 130° C., the polymerization activity will be reduced. If the contact time of the suspension with the titanium halide is shorter than 30 minutes, both the polymerization activity and the yield of the stereoregular polymer will be reduced. If the contact time exceeds 100 hours, no additional advantage will not be obtained in proportion to such extension of the contact time. Thus, the upper limit of the contact time is set only for economical reasons. The resultant solid matter may repeatedly be brought into contact with the titanium tetrahalide. In any event, the solid matter is finally washed with an organic solvent. Preferable examples of the organic solvent utilizable for this washing involves normally liquid saturated aliphatic hydrocarbons such as n-hexane and n-heptan. A series of these treatments in the preparation of the catalyst components are preferably carried out in the absence of air and moisture.

The solid catalyst component thus prepared is then combined with the piperidine derivative and the organoaluminum compound to form a catalyst for the polymerization of olefins. In the preparation of the catalyst, the organoaluminum compound is used in an amount of 1-1000 mols per titanium atom in the solid catalyst component while the piperidine derivative is used in an amount of 0.005-1.0 mol per mol of the organoaluminum compound.

The polymerization of olefins by the aid of the catalyst of the present invention can be carried according to a usual method for gas or bulk polymerization in the absence of an organic solvent or for slurry polymerization in the presence of an organic solvent. The olefin utilizable for the polymerization is $C_1$-$C_4$ $\alpha$-olefins and involves ethylene, propylene, 1-butene and a mixture of these olefins. Such olefin can be used in either gaseous or liquid state. The polymerization temperature adopted in this case is lower than 200° C., preferably lower than 100° C. while the polymerization pressure is less than 100 kg/cm$^2$G, preferably less than 50 kg/cm$^2$G. These conditions generally vary according to the sort of olefins, the type of polymerization adopted and can be selected suitably by those skilled in the art, taking the various factors for polymerization into consideration.

In case the polymerization of olefins is carried out with the aid of the catalyst of this invention possessing a very high catalytic activity, the resultant polymers have a significantly high stereoregularity and any residue of the catalyst in the resultant polymer can be controlled to an extremely low level. In addition, the amount of a residual chlorine in the resultant polymer is extremely small so that any influence of chlorine on the polymer can be eliminated to such a degree that any deashing treatment is quite unnecessary as after-treatment. Chlorine contained in the resultant polymer can cause on one hand corrosion of apparatus used for granulation and shaping of the polymer and on the other hand deterioration and yellowing of the resultant polymer itself. Thus, such serious reduction of the chlorine content is indeed meaningful for the production of olefin polymers.

Further, it is one of the characteristic features of the present invention to omit the use of an ester of an aromatic carboxylic acid for the polymerization of olefins thereby solving the problem of "odor" in the resultant polymer and overcoming the drawback of the so-called supported catalysts which is shown by considerable reduction in activity per unit time of the catalyst with the lapse of time.

It is generally admitted in the production of olefin polymers in industrial scale, that hydrogen is allowed to be co-existent in the polymerization system to control the melt index of the resultant polymer. However, the prior art catalyst comprising a catalyst component involving magnesium halide as carrier has such a drawback that its activity and stereospecific performance are seriously deteriorated in the co-existence of hydrogen in the polymerization system. In contrast, the catalyst of the present invention achieves a significant merit that its catalytic activity and stereospecific performance are scarcely deteriorated in case of performing the polymerization of olefins in the co-existence of hydrogen even if the melt index of the resultant polymer is extremely high.

In the production of olefin polymers, the bulk density of the resultant polymer is one of the important factors. It is an additional merit of the catalyst of the present invention that an excellent effect is exhibited also in this factor. Thus, the catalyst of the present invention contributes greatly in the production of stereoregular olefin polymers in a higher yield.

The present invention will now be illustrated in more detail by way of Examples and Comparative Examples.

EXAMPLE 1

(A) The preparation of a solid catalyst component:

In a 200 ml round-bottomed flask equipped with a stirrer, the air in which had been substituted sufficiently with nitrogen, were placed 5.0g of diethoxymagnesium, 2.0 g of dibutyl phthalate and 25 ml of methylene chloride to form a mixture in suspended state. The mixture was stirred for one hour under reflux. The suspension thus formed was introduced under pressure into a 500 ml round-bottomed flask equipped with a stirrer and charged with 200 ml of TiCl₄ kept at room temperature. The mixture was heated to 120° C. and reacted for 2 hours with stirring. After completion of the reaction, the reaction mixture was washed ten times each with 200 ml of n-heptane maintained at 40° C. To the solid matter thus obtained was added 200 ml of fresh TiC14, and the mixture was reacted for 2 hours with stirring at 120° C. After completion of the reaction, the reaction mixture was cooled down to 40° C. and then washed repeatedly with 200 ml of n-heptane until chlorine was no longer detected in the washing liquid, whereupon the washing treatment was finished to yield a solid catalyst component. The solid and liquid phases in the solid catalyst component were separated and the titanium content in the solid phase was measured whereby the content was determined as 2.21% by weight.

(B) Polymerization:

In a 2.0 l autoclave equipped with a stirrer, the air in which had been replaced entirely by nitrogen, were placed 700 ml of n-heptane. The autoclave was charged successively with 301 mg of triethylaluminum, 73 mg of 2,2,6,6-tetramethylpiperidine and the solid catalyst component in an amount of 0.2 mg in terms of titanium, while maintaining the nitrogen atmosphere. Into the autoclave was then charged 300 ml of hydrogen and the mixture was heated to 70° C. Gaseous propylene was introduced into the autoclave and subjected to polymerization for 4 hours while maintaining the pressure at 6 kg/cm²G.

After the polymerization, the resultant solid polymer was collected by filtration and warmed at 80° C. under reduced pressure for drying. On the other hand, the filtrate was concentrated to obtain a polymer having been dissolved in the polymerization solvent. The solid polymer was extracted with boiling n-hexane for 6 hours to obtain a polymer insoluble in n-hexane. Designating the amount of the polymer dissolved in the polymerization solvent as (A), the amount of the solid polymer as (B) and the amount of the polymer insoluble in n-hexane as (C), the polymerization activity (D) per solid catalyst component can be calculated according to the following formula:

$$(D) = \frac{[(A) + (B)] (g)}{\text{Amount of the solid catalyst component (g)}}.$$

The yield (E) of the total crystalline polymer is calculated according to the following formula:

$$(E) = \frac{(C)}{(A) + (B)} \times 100(\%).$$

A result of the polymerization is shown in Table 1 wherein the content of residual chlorine is designated as (F), the melt index of the polymer as (G) and the bulk density as (H).

EXAMPLE 2

An experiment was carried out in the same manner as described in Example 1 except that the polymerization time was 2 hours. A result of the experiment is shown in Table 1.

EXAMPLE 3

An experiment was carried out in the same manner as described in Example 1 except that the amount of the solid catalyst component used was 0.1 mg and the polymerization time was 6 hours. A result of the experiment is shown in Table 1.

EXAMPLE 4

An experiment was carried out in the same manner as described in Example 1 except that the amount of 2,2,6,6-tetramethylpiperidine used was 151 mg. A result of the experiment is shown in Table 1.

EXAMPLE 5

The preparation of a solid catalyst component was carried out in the same manner as described in Example 1 except that 1.5 g of dipropyl phthalate was used in place of dibutyl phthalate. In this case, the content of titanium in the solid matter was 2.47% by weight. An experiment for polymerization was carried out in the same manner as described in Example 1. A result of the experiment is shown in Table 1.

EXAMPLE 6

The preparation of a solid catalyst component was carried out in the same manner as described in Example 1 except that the reaction temperature was 115° C. In this case, the content of titanium in the solid matter was 2.39% by weight. An experiment for polymerization was carried out also in the same manner as described in Example 1. A result of the experiment is shown in Table 1.

EXAMPLE 7

The preparation of a solid catalyst component was carried out in the same manner as described in Example 1 except that 1,2-dichloroethane was used in place of methylene chloride. In this case, the content of titanium in the solid matter was 2.18% by weight. An experiment for polymerization was carried out in the same manner as described in Example 1. A result of the experiment is shown in Table 1.

COMPARATIVE EXAMPLE 1

In a 500 ml round-bottomed flask equipped with a stirrer, the air in which had been replaced fully with nitrogen, was placed 150 ml of carbon tetrachloride. 11.4 Grams of ethoxymagnesium was suspended in the carbon tetrachloride, and after elevating the temperature to 75° C., 4.8 ml of ethyl benzoate and 150 ml of TiCl₄ were added to the suspension. The mixture was reacted under agitation for 2 hours while maintaining the above temperature. After completion of the reaction, the solid matter was isolated, washed 5 times each with 500 ml of iso-octane, suspended in 150 ml of TiCl₄ at 80° C. and reacted together for further 2 hours under agitation while maintaining the above temperature. After the reaction, the solid matter was washed 5 times each with 500 ml of iso-octane to prepare a (solid) catalyst component. In this case, the content of titanium in the solid matter was 1.88% by weight. An experiment for polymerization was carried out in the same manner as described in Example 1 except that 151 mg of p-methoxymethyl benzoate was used in place of 75 mg of 2,2,6,6-tetramethylpiperidine. A result of the experiment is shown in Table 1.

COMPARATIVE EXAMPLE 2

An experiment was carried out in the same manner as described in Comparative Example 1 except that the polymerization time was 6 hours. A result of the experiment is shown in Table 1.

COMPARATIVE EXAMPLE 3

The preparation of a (solid) catalyst component was carried out in the same manner as described in Example 1 except that powdery magnesium chloride which had been obtained by pulverizing magnesium chloride in a 1-liter vibrating mill pot charged up to 4/5 of its capacity with stainless balls of 25 mm in diameter at a vibration number of 1430 v.p.m. and an amplitude of 3.5 mm for 30 hours was substituted for diethoxymagnesium. In this case, the content of titanium in the solid matter was 4.19% by weight. An experiment for polymerization was carried out in the same manner as described in Example 1 except that the (solid) catalyst component was used in an amount of 0.5 mg in terms of titanium atom. A result of the experiment is shown in Table 1.

It is understood that the preceding representative examples may be varied within the scope of the present specification both as to reactants and reaction conditions, by one skilled in the art to achieve essentially the same results.

As many widely different embodiments of this invention may be made without departing from the spirit and scope thereof, it is to be construed that this invention is not limited to the specific embodiments thereof except as defined in the appended claims.

least one of $R^1$ and $R^2$ and/or at least one of $R^3$ and $R^4$ is an alkyl group; and (C) an organoaluminum compound, wherein the solid catalyst component (A) has been prepared by mixing (a) a dialkoxymagnesium and (b) a diester of an aromatic dicarboxylic acid with (c) a halogenated hydrocarbon to form a suspension and thereafter adding the suspension to (d) titanium tetrahalide to effect reaction.

2. The catalyst according to claim 1, wherein the disubstituted or tetrasubstituted piperidine is 2,6-dialkylpiperidine or 2,2,6,6-tetraalkylpiperidine.

3. The catalyst according to claim 1, wherein the organoaluminum compound is of the general formula:

a $C_1$–$C_8$ alkyl group, Q and Q' may be the same or different and each represents R or X, and X is a halogen atom.

4. The catalyst according to claim 3, wherein the organoaluminum compound is a trialkylaluminum.

5. The catalyst according to claim 1, wherein the organoaluminum compound is used in an amount of 1–1000 mols per titanium atom in the solid catalyst component.

6. The catalyst according to claim 1, wherein the piperidine derivative is used in an amount of 0.005–1.0 mol per mol of the organoaluminum compound.

TABLE 1

|  | Example | | | | | | | Comparative Example | | |
|---|---|---|---|---|---|---|---|---|---|---|
|  | 1 | 2 | 3 | 4 | 5 | 6 | 7 | 1 | 2 | 3 |
| Amount of the polymer dissolved in the polymerization solvent (A) (g) | 1.8 | 1.0 | 1.3 | 1.9 | 1.8 | 2.1 | 1.7 | 1.6 | 1.7 | 2.0 |
| Amount of the solid polymer (B) (g) | 357 | 198 | 243 | 368 | 316 | 341 | 352 | 54.0 | 55.1 | 30.2 |
| Polymerization activity per solid catalyst component (D) | 39600 | 21900 | 53900 | 40800 | 39200 | 41000 | 38600 | 5250 | 5360 | 2716 |
| Yield of the total crystalline polymer (E) (%) | 97.4 | 97.4 | 97.5 | 97.6 | 97.3 | 97.2 | 97.4 | 95.0 | 94.8 | 87.9 |
| Amount of the residual chlorine in the resultant polymer (F) (ppm) | 13 | 23 | 10 | 13 | 13 | 12 | 13 | 110 | 112 | 215 |
| MI of the resultant polymer (G) | 19 | 17 | 22 | 21 | 26 | 22 | 16 | 2.8 | 2.3 | 18 |
| Bulk density of the resultant polymer (H) | 0.38 | 0.39 | 0.38 | 0.38 | 0.39 | 0.38 | 0.39 | 0.35 | 0.36 | 0.30 |

What is claimed is:

1. A catalyst for the polymerization of olefins which consists essentially of:

(A) a solid catalyst component, (B) a piperidine disubstituted or tetrasubstituted derivative of the general formula:

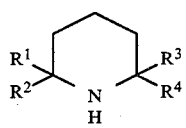

(III)

wherein $R^1$, $R^2$, $R^3$ and $R^4$ each stands for a hydrogen atom or an alkyl group with the proviso that at 7. A solid catalyst component for catalysts utilizable for the polymerization of olefins which has been prepared by a process consisting essentially of mixing (a) a dialkoxymagnesium and (b) a diester of an aromatic dicarboxylic acid with (c) a halogenated hydrocarbon to form a suspension and thereafter adding the suspension to (d) a titanium tetrahalide thereby effecting reaction to obtain a solid matter.

8. The solid catalyst component according to claim 7, wherein the solid matter has further been treated with the titanium tetrahalide.

9. The solid catalyst component according to claim 7, wherein the dialkoxymagnesium is of the general formula:

A—Mg—A'                    (I)

wherein A and A' may be the same or different and each represents a $C_1$-$C_8$ alkoxy group.

10. The solid catalyst component according to claim 7, wherein the dialkoxymagnesium is diethoxymagnesium, dipropoxymagnesium, diisopropoxymagnesium, di-n-butoxymagnesium, di-secbutoxymagnesium, and di-tert-butoxymagnesium.

11. A solid catalyst component according to claim 7, wherein the diester is a phthalic diester of the general formula:

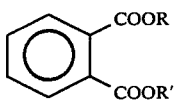
(II)

wherein R and R' may be the same or different and each represents a $C_1$-$C_8$ alkyl group which may be branched at any position.

12. The solid catalyst component according to claim 11, wherein the diester is dimethyl phthalate, diethyl phthalate, dipropyl phthalate, dibutyl phthalate, diisobutyl phthalate, diamyl phthalate, diisoamyl phthalate, methyl ethyl phthalate, methyl propyl phthalate, methyl butyl phthalate, methyl isobutyl phthalate, ethyl propyl phthalate, ethyl butyl phthalate, ethyl isobutyl phthalate, propyl butyl phthalate, propyl isobutyl phthalate, propyl amyl phthalate or butyl amyl phthalate.

13. The solid catalyst component according to claim 7, wherein the halogenated hydrocarbon is a normally liquid halogenated, aromatic or aliphatic hydrocarbon.

14. The solid catalyst component according to claim 13, wherein the halogenated hydrocarbon is propyl chloride, butyl chloride, butyl bromide, propyl iodide, chlorobenzene, benzyl chloride, methylene chloride, dichloroethane, dichloropropane, dichlorobenzene, chloroform, trichloroethylene, trichloroethane or carbon tetrachloride.

15. The solid catalyst component according to claim 7, wherein the titanium tetrahalide is TiCl₄.

16. A process for the preparation of a solid catalyst component utilizable for the polymerization of olefins which consists essentially of mixing (a) a dialkoxymagnesium and (b) a diester of an aromatic dicarboxylic acid with (c) a halogenated hydrocarbon to form a suspension and thereafter adding the suspension to (d) a titanium tetrahalide thereby effecting reaction to obtain a solid matter.

17. The process according to claim 16, wherein the solid matter is further treated with the titanium tetrahalide.

18. The process according to claim 16, wherein the dialkoxymagnesium is of the general formula:

A—Mg—A'   (I)

wherein A and A' may be the same or different and each represents a $C_1$-$C_8$ alkoxy group.

19. The process according to claim 18, wherein the dialkoxymagnesium is diethoxymagnesium, dipropoxymagnesium, diisopropoxymagnesium, di-n-butoxymagnesium, di-sec-butoxymagnesium or di-tert-butoxymagnesium.

20. The process according to claim 16, wherein the diester is a phthalic diester of the general formula:

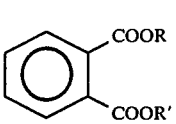
(II)

wherein R and R' may be the same or different and each represents a $C_1$-$C_8$ alkyl group which may be branched at any desired position.

21. The process according to claim 20, wherein the diester dimethyl phthalate, diethyl phthalate, dipropyl phthalate, dibutyl phthalate, diisobutyl phthalate, diamyl phthalate, diisoamyl phthalate, methyl ethyl phthalate, methyl propyl phthalate, methyl butyl phthalate, methyl isobutyl phthalate, ethyl propyl phthalate, ethyl butyl phthalate, ethyl isobutyl phthalate, propyl butyl phthalate, propyl isobutyl phthalate, propyl amyl phthalate or butyl amyl phthalate.

22. The process according to claim 16, wherein the halogenated hydrocarbon is a normally liquid halogenated aromatic or aliphatic hydrocarbon.

23. The process according to claim 22, wherein the halogenated hydrocarbon is propyl chloride, butyl chloride, butyl bromide, propyl iodide, chlorobenzene, benzyl chloride, methylene chloride, dichloroethane, dichloropropane, dichlorobenzene, chloroform, trichloroethylene, trichloroethane or carbon tetrachloride.

24. The process according to claim 16, wherein the titanium tetrahalide is TiCl₄.

25. The process according to claim 16, wherein the temperature at the reaction between the suspension and the titanium tetrahalide and the temperature at the treatment of the solid matter with further titanium tetrahalide are commonly within the range of 90°–130° C.

26. The process according to claim 16, wherein the time for the reaction between the suspension and the titanium tetrahalide and the time for the treatment of the solid matter with further titanium tetrahalide are commonly at least 30 minutes.

27. The process according to claim 16, wherein 0.1–1 g of the diester and at least 1 g of the titanium tetrahalide are used per gram of the dialkoxymagnesium.

28. The solid catalyst component according to claim 12, wherein the diester is dimethyl phthalate, diethyl phthalate, dipropyl phthalate, dibutyl phthalate, diisobutyl phthalate, diamly phthalate, diisodmyl phthalade, methyl ethyl, phtholate, methyl propyl phthalate, methyl butyl phthalate, methyl isobutyl phthalate, ethyl propyl phthalate, ethyl butyl phthalate, ethyl isobutyl phthalate, propyl butyl phthalate, propyl isobutyl phthalate, propyl amyl phthalate or butyl amyl phthalate.

29. The solid catalyst component according to claim 9, wherein A and A' are identical with each other or are $C_2$-$C_4$ alkoxy groups.

30. The solid catalyst component according to claim 11, wherein R and R' are $C_2$-$C_5$ alkyl groups or are branched at any position.

31. The catalyst according to claim 1, wherein the alkyl group of the piperdine is a $C_1$-$C_8$ alkyl group.

32. A catalyst for the polymerization of olefins which consists of:
(A) a solid catalyst component,
(B) a piperidine disubstituted or tetrasubstituted derivative of the general formula:

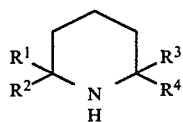 (III)

wherein $R^1$, $R^2$, $R^3$ and $R^4$ each stands for a hydrogen atom or an alkyl group with the proviso that at least one of $R^1$ and $R^2$ and/or at least one of $R^3$ and $R^4$ is an alkyl group; and (C) an organoaluminum compound, wherein the solid catalyst component (A) has been prepared by mixing (a) a dialkoxymagnesium and (b) a diester of an aromatic dicarboxylic acid with (c) a halogenated hydrocarbon to form a suspension and thereafter adding the suspension to (d) titanium tetrahalide to effect reaction.

33. A solid catalyst component for catalysts utilizable for the polymerization of olefins which has been prepared by a process consisting of mixing (a) a dialkozymagnesium and (b) a diester of an aromatic dicarboxylic acid with (c) a halogenated hydrocarbon to form a suspension and thereafter adding the suspension to (d) a titanium tetrahalide thereby effecting reaction to obtain a solid matter.

34. A process for the preparation of a solid catalyst component utilizable for the polymerization of olefins which consists of mixing (a) a dialkozymagnesium and (b) a diester of an aromatic dicarboxylic acid with (c) a halogenated hydrocarbon to form a suspension and thereafter adding the suspension to (d) titanium tetrahalide thereby effecting reaction to obtain a solid matter.

* * * * *